US012751896B2

(12) United States Patent
Zhao et al.

(10) Patent No.: US 12,751,896 B2
(45) Date of Patent: Oct. 6, 2026

(54) MASSAGE NOZZLE FOR HOT TUB

(71) Applicant: Guangzhou Rising Dragon Recreation Industrial Co., Ltd., Guangzhou (CN)

(72) Inventors: Huaibin Zhao, Guangzhou (CN); Xuewen Liu, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 178 days.

(21) Appl. No.: 18/747,483

(22) Filed: Jun. 19, 2024

(65) Prior Publication Data

US 2025/0107966 A1 Apr. 3, 2025

(30) Foreign Application Priority Data

Sep. 28, 2023 (CN) ......................... 202322650599.0

(51) Int. Cl.
*A61H 33/00* (2006.01)

(52) U.S. Cl.
CPC ................................ *A61H 33/6063* (2013.01)

(58) Field of Classification Search
CPC .......................... A61H 33/6063; A61H 33/027
See application file for complete search history.

(56) References Cited

U.S. PATENT DOCUMENTS

| | | | | | |
|---|---|---|---|---|---|
| 5,353,447 | A * | 10/1994 | Gravatt | A61H 33/027 | 239/587.1 |
| 5,810,262 | A * | 9/1998 | Ton | A61H 33/6063 | 601/169 |
| 6,123,274 | A * | 9/2000 | Perdreau | A61H 33/6052 | 239/587.3 |
| 2005/0039251 | A1 * | 2/2005 | Colin | A61H 33/027 | 4/541.6 |
| 2012/0005819 | A1 * | 1/2012 | Yuhas | A61H 33/027 | 29/428 |
| 2020/0038287 | A1 * | 2/2020 | Backer | F16L 33/035 | |

* cited by examiner

*Primary Examiner* — Christine J Skubinna
(74) *Attorney, Agent, or Firm* — Frank Niranjan

(57) ABSTRACT

A massage nozzle includes a nozzle body Venturi core having two ends welded with an inner side wall of a water inlet end of a nozzle body, and an end of the nozzle body Venturi core away from a water spraying end is welded between a water inlet and an air inlet, and the side wall of the nozzle body Venturi core is provided with air inlet through holes. The welding of the two ends of the nozzle body Venturi core achieves improved airtightness of the air cavity between the nozzle body Venturi core and the nozzle body. The air entering the air inlet passes through the air cavity and is mixed into the water through the air inlet through holes, which enhances the Venturi effect and enables the air to have a stronger acceleration and pressure when flowing through the nozzle, thus forming more bubbles and stronger massage effect.

13 Claims, 11 Drawing Sheets

MASSAGE NOZZLE FOR HOT TUB

TECHNICAL FIELD

The present invention relates to the technical field of hot tub nozzles, in particular to a massage nozzle for a hot tub.

BACKGROUND

Hot tub massage nozzles are a common bathroom facility designed to provide a comfortable massage experience by mixing jets of water and air to generate bubbles. Traditional massage nozzle designs usually realize massage effect through the combination of nozzle body and nozzle core seat. Venturi effect is applied between nozzle body and nozzle core seat as a key mechanism to produce the bubbles. However, there are some technical limitations in the past designs, such as air leakage from the air chamber between the air inlet and the waterway due to poor airtightness of the air chamber, which may lead to unstable Venturi effect and insufficient bubble generation, thus affecting the massage effect and user experience. Therefore, in order to overcome the limitations of traditional massage nozzle designs, there is a need to provide an improved massage nozzle for hot tub to achieve better Venturi effect and air jetting effect, so that the nozzle can generate more bubbles, thus providing an improved massage effect.

SUMMARY

The present invention is directed to a massage nozzle for a hot tub, which solves the problems of unstable Venturi effect and insufficient bubble generation caused by the poor air tightness of the air cavity between the air inlet and the waterway in some existing massage nozzles.

A massage nozzle for a hot tub is provided which includes a nozzle body, a nozzle body Venturi core, a rotary bushing and a nozzle surface cover. The nozzle body includes a water inlet end and an opposite water spraying end. The water inlet end is provided with a water inlet and an air inlet, the water inlet and the air inlet are staggeredly arranged relative to each other, and the air inlet is closer to the water spraying end than the water inlet. The water spraying end is formed with an accommodating through hole allowing for insertion of the rotary bushing. Two ends of the nozzle body Venturi core are sealed and welded with an inner wall surface of the water inlet end of the nozzle body, and one end of the nozzle body Venturi core away from the water spraying end is welded between the water inlet and the air inlet. A side wall of the nozzle body Venturi core is provided with a plurality of air inlet through holes, and the nozzle body Venturi core is hollow in a length direction as a water flow channel. The rotary bushing is arranged at the water spraying end, and includes a water inlet channel which is connected with the nozzle body Venturi core, and the nozzle surface cover is arranged on a side of the rotary bushing away from the nozzle body Venturi core.

Preferably, the nozzle body Venturi core includes a hollow cylindrical Venturi core body and a support platform arranged on an outer periphery of the hollow cylindrical Venturi core body. An end of the hollow cylindrical Venturi core body away from the support platform is welded between the water inlet and the air inlet, and the support platform is circular-ring shaped and welded on an inner wall surface of the nozzle body.

Preferably, an inner wall surface of the nozzle body at the accommodating through hole is provided with an annular groove which is concave toward an outer wall surface of the nozzle body, an outer side of the rotary bushing is provided with an annular accommodating groove, and an annular rubber ring adapted to the annular groove is arranged in the annular accommodating groove. When the rotary bushing is installed to the nozzle body, the annular rubber ring of the rotary bushing will be clamped into the annular groove. At this time, the rotary bushing and the nozzle body can be tightly connected, and the sealing connection between the rotary bushing and the nozzle body is realized, resulting in an improved air tightness.

Preferably, the rotary bushing includes a rotary bushing body and a nozzle core; the rotary bushing body has a trumpet-like structure with a small-diameter end portion and a large-diameter end portion, the small-diameter end portion of the rotary bushing body is inserted into the hollow cylindrical Venturi core body, and the large-diameter end portion of the rotary bushing body is provided with the nozzle core. It should be noted that the part of the hollow cylindrical Venturi core body penetrating through a middle of the support platform and protruding a predetermined distance beyond the support platform is inserted into the small-diameter end portion of the rotary bushing body, so that water can reach the rotary bushing through the nozzle body Venturi core, and then can be sprayed from the nozzle core.

A cam is arranged at a distal end of the small-diameter end portion of the rotary bushing body, and a protrusion for engaging with the cam is arranged on the support platform. Preferably, the protrusion can be constructed in a structure similar to a right triangle, in which one right-angle side is connected with the support platform. The cam is a sheet-like structure that protrudes in a direction away from the nozzle surface cover, and has rounded transitions at corners. It is to be understood that, the protrusion is not required to be approximately a right triangle, it is only required to have an inclined plane inclined from the support platform to the nozzle surface cover, which will not be described in detail here.

In disassembly of the nozzle body and the rotary bushing, the user only needs to rotate the rotary bushing. When the cam reaches the lowest end of the protrusion where the protrusion is connected with the support platform, the protrusion comes into contact with the cam. The rotary bushing is continually rotated so that the cam gradually moves upward (i.e., toward the nozzle surface cover) along the inclined plane of the protrusion. The annular groove on the nozzle body can be easily separated from the annular rubber ring on the rotary bushing under the force provided in the direction away from the water inlet end. Upon continuing rotation of the rotary bushing, the rotary bushing can be easily removed from the nozzle body. With this design, it is simple and convenient to disassemble the nozzle body and the rotary bushing. The user only needs to rotate the rotary bushing, so that the protrusion can be engaged with the cam, and a sufficient force can be provided to make the annular groove on the nozzle body separate from the annular rubber ring on the rotary bushing. In this way, the user can easily replace, clean or repair the rotary bushing, so as to achieve a better maintenance and use experience.

The nozzle core can be one of a spherical nozzle core, a straight nozzle core, a rotary nozzle core and a multi-port nozzle core. When users use the nozzle, different types of nozzle cores can be chosen according to their own preferences and needs (that is, choose different nozzle cores), such as spherical, straight, rotary or multi-port nozzle cores, so as to obtain personalized and diversified massage effects. It should be noted that the adoption of the nozzle body Venturi core can keep the water outlet normally open, and the user can rotate the nozzle surface cover to realize the rotary adjustment of the water outlet direction of the nozzle core, so that the problem of the traditional water outlet with switch function that the water outlet direction of the nozzle cannot be adjusted can be overcome.

Preferably, the rotary bushing is provided with a catch slot, and a side of the nozzle surface cover is provided with a catch engaged in the catch slot. During installation, the connection between the nozzle surface cover and the rotary bushing is realized by engaging the catch on the nozzle surface cover into the catch slot at the rotary bushing, which is simple and reliable.

Preferably, the outer side of the nozzle body is provided with an external thread. The massage nozzle for a hot tub also includes a fastener with an internal thread, which is screwed onto the external thread of the nozzle body, and is engaged with the nozzle surface cover so as to be installed at the installation position on the hot tub.

Compared with the prior art, the present invention has the following beneficial effects: the massage nozzle for a hot tub includes a nozzle body, a nozzle body Venturi core, a rotary bushing and a nozzle surface cover. Two ends of the nozzle body Venturi core are welded with the inner wall surface of the water inlet end of the nozzle body, and one end of the nozzle body Venturi core away from the water spraying end is welded between the water inlet and the air inlet. A plurality of air inlet through holes is defined through a side wall of the nozzle body Venturi core. The welding of the two ends of the nozzle body Venturi core achieves improved airtightness of the air cavity formed between the outer wall surface of the nozzle body Venturi core and the inner wall surface of the nozzle body. When the air inlet sucks air, the air entering the air inlet passes through the air cavity and is mixed into the water through the air inlet through holes, which enhances the Venturi effect and enables the air to have a stronger acceleration and pressure when flowing through the nozzle, thus forming more bubbles and stronger massage effect. Therefore, the massage nozzle for a hot tub achieves better Venturi effect and air jetting effect, provides users with more comfortable, richer and more personalized massage experience, and improves the function and practicability of hot tub massage facilities.

Figure 1:
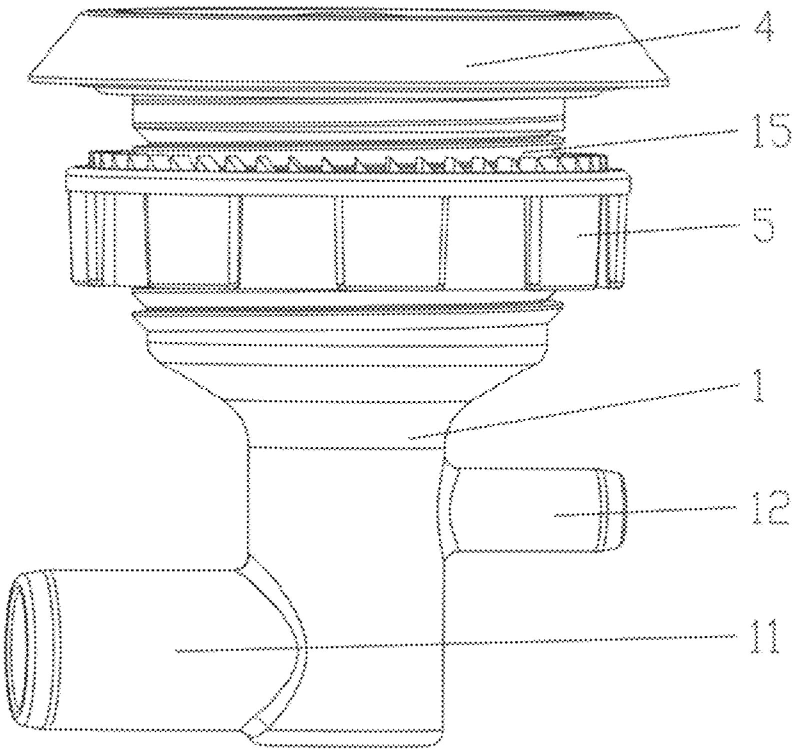
FIG. 1 is a schematic structural diagram of a massage nozzle for a hot tub of the present invention.
Figure 2:
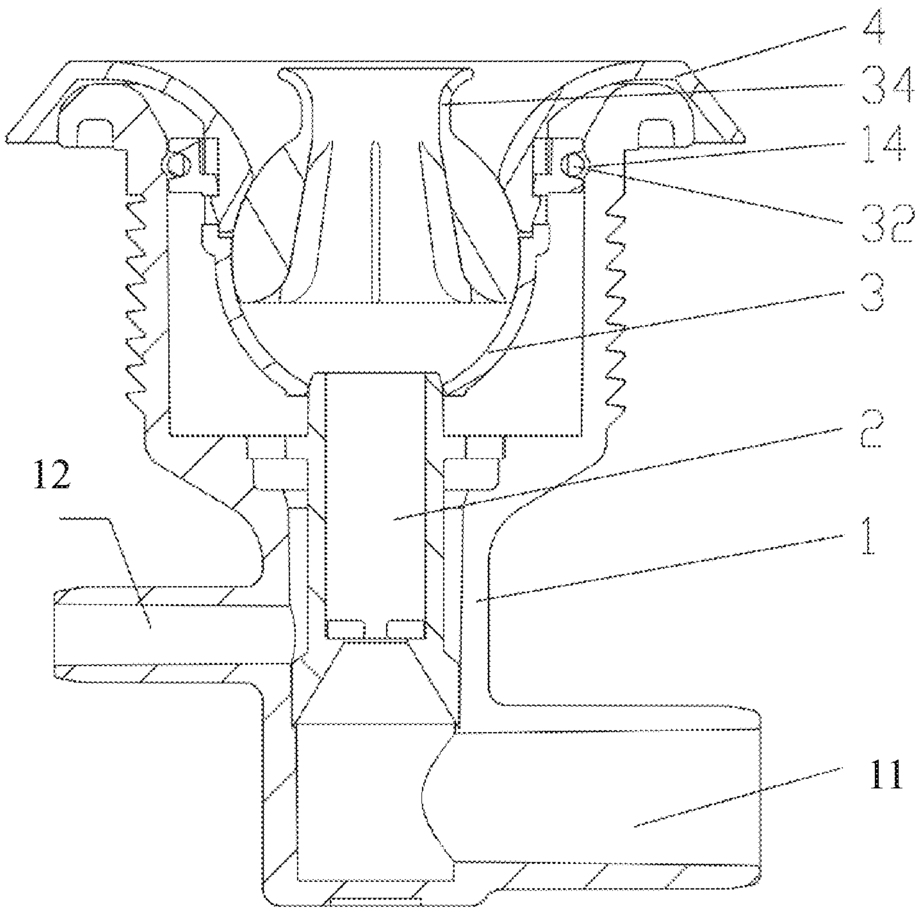
FIG. 2 is a sectional view of the massage nozzle for a hot tub of the present invention.
Figure 3:
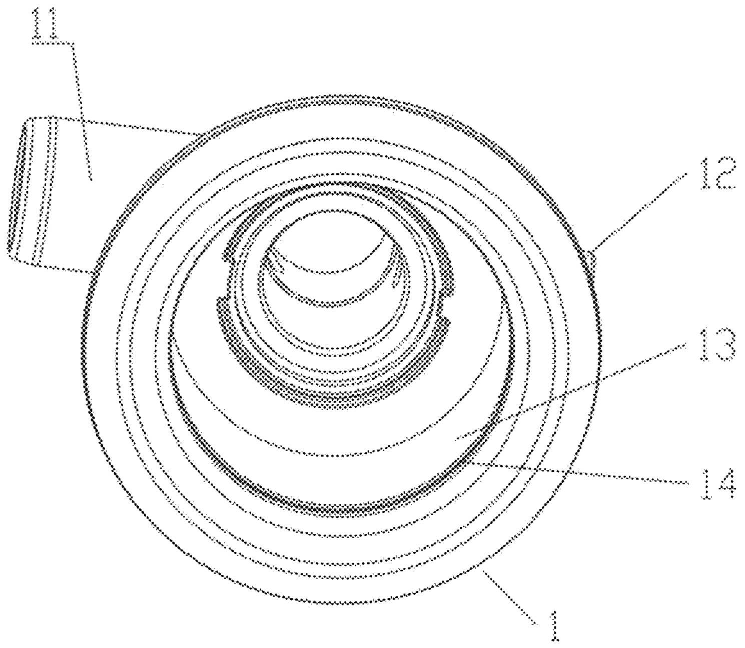
FIG. 3 is a schematic structural diagram of the nozzle body of the present invention.
Figure 4:
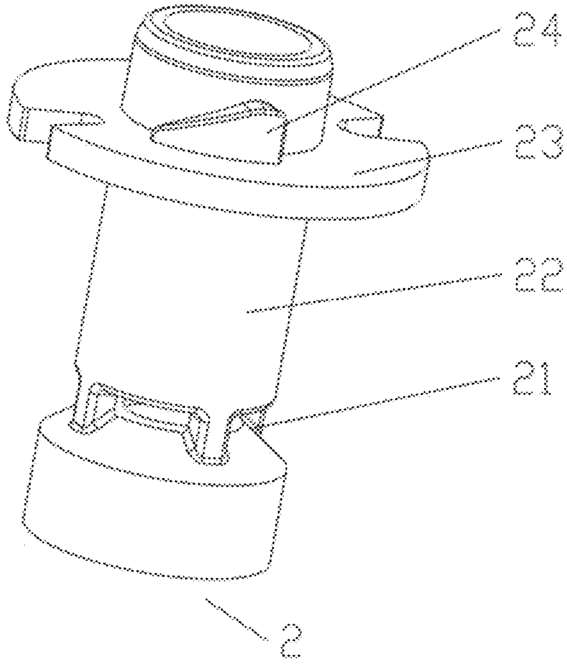
FIG. 4 is a schematic structural diagram of the nozzle body Venturi core of the present invention.

1—Nozzle body, 2—Nozzle body Venturi core, 3—Rotary bushing, 4—Nozzle surface cover, 5—Fastener, 11—Water inlet, 12—Air inlet, 13—Accommodating through hole, 14—Annular groove, 15—External thread, 21—Air inlet through hole, 22—Hollow cylindrical Venturi core body, 23—Support platform, 24—Protrusion, 31—Annular accommodating groove, 32—Annular rubber ring, 33—Rotary bushing body, 34—Nozzle core, 35—Cam, 36—Catch slot, 41—Catch.

DESCRIPTION OF EMBODIMENTS

In order to make objectives, technical solutions and advantages of the embodiments of the present invention clearer, the technical solutions of the embodiments of the present invention will be described clearly and completely below with reference to the accompanying drawings in the embodiments of the present invention.

Referring to FIGS. 1 to 11, this embodiment provides a massage nozzle for a hot tub, which includes a nozzle body 1, a nozzle body Venturi core 2, a rotary bushing 3 and a nozzle surface cover 4. The nozzle body 1 includes a water inlet end and an opposite water spraying end, the water inlet end is provided with a water inlet 11 and an air inlet 12, and the water inlet 11 and the air inlet 12 are staggeredly arranged relative to each other, and the air inlet 12 is closer to the water spraying end than the water inlet 11. The water spraying end is formed with an accommodating through hole 13 allowing for insertion of the rotary bushing 3. Two ends of the nozzle body Venturi core 2 are welded with an inner wall surface of the water inlet end of the nozzle body 1, and an end of the nozzle body Venturi core 2 away from the water spraying end is welded between the water inlet 11 and the air inlet 12. A plurality of air inlet through holes 21 are defined through a side wall of the nozzle body Venturi core 2, and the nozzle body Venturi core 2 is hollow in the length direction as a water flow channel. The rotary bushing 3 is arranged at the water spraying end, and includes a water inlet channel which is connected with the nozzle body Venturi core 2, and the nozzle surface cover 4 is arranged on a side of the rotary bushing 3 away from the nozzle body Venturi core 2.

Preferably, the nozzle main Venturi core 2 includes a hollow cylindrical Venturi core body 22 and a support platform 23 arranged on an outer periphery of the hollow cylindrical Venturi core body 22. An end of the hollow cylindrical Venturi core body 22 away from the support platform 23 is welded between the water inlet 11 and the air inlet 12, and the support platform 23 is circular-ring shaped and welded on the inner wall surface of the nozzle body 1.

Preferably, an inner wall surface of the nozzle body 1 at the accommodating through hole 13 is provided with an annular groove 14 which is concave toward an outer wall surface of the nozzle body 1. An outer side of the rotary bushing 3 is provided with an annular accommodating groove 31, and an annular rubber ring 32 adapted to the annular groove 14 is provided in the annular accommodating groove 31. When the rotary bushing 3 is installed to the nozzle body 1, the annular rubber ring 32 of the rotary bushing 3 will be clamped into the annular groove 14. At this time, the rotary bushing 3 and the nozzle body 1 can be tightly connected, and the sealing connection between the rotary bushing 3 and the nozzle body 1 is realized, resulting in an improved air tightness.

The rotary bushing 3 includes a rotary bushing body 33 and a nozzle core 34. The rotary bushing body 33 has a trumpet-like structure with a small-diameter end portion and a large-diameter end portion. The small-diameter end portion of the rotary bushing body 33 is inserted into the hollow cylindrical Venturi core body 22, and the large-diameter end portion of the rotary bushing body 33 is provided with the nozzle core 34. It should be noted that the part of the hollow cylindrical Venturi core body 22 penetrating through a middle of the support platform 23 and protruding a predetermined distance beyond the support platform 23 is inserted into the small-diameter end portion of the rotary bushing body 33, so that water can reach the rotary bushing 3 through the nozzle body Venturi core 2, and then can be sprayed from the nozzle core 34.

Referring to FIG. 4, FIG. 5, FIG. 6 and FIG. 7, a cam 35 is arranged at the distal end of the small-diameter end portion of the rotary bushing body 33, and a protrusion 24 for engagement with the cam 35 is arranged on the support platform 23. As a preferred solution, the protrusion 24 can be constructed in a structure similar to a right triangle, in which one right-angle side is connected with the support platform 23. The cam 35 is a sheet-like structure that protrudes in a direction away from the nozzle surface cover 4, and has rounded transitions at corners. It is to be understood that, the protrusion 24 is not required to be approximately a right triangle, it is only required to have an inclined plane inclined from the support platform 23 to the nozzle surface cover 4, which will not be described in detail here. It should be noted that, referring to FIG. 6 and FIG. 7, in this embodiment, the position of the protrusion can vary according to the use situation, for example, the protrusion can also be disposed on the nozzle body, and the specific position is not limited, as long as the protrusion and the cam can cooperate to facilitate the disassembly of the rotary bushing.

In disassembly of the nozzle body 1 and the rotary bushing 3, the user only needs to rotate the rotary bushing 3. When the cam 35 reaches the lowest end of the protrusion 24 where the protrusion 24 is connected with the support platform 23, the protrusion 24 comes into contact with the cam 35. The rotary bushing 3 is continually rotated so that the cam 35 gradually moves upward (i.e., toward the nozzle surface cover 4) along the inclined plane of the protrusion 24. The annular groove 14 on the nozzle body 1 can be easily separated from the annular rubber ring 32 on the rotary bushing 3 under the force provided in the direction away from the water inlet end. Upon continuing rotation of the rotary bushing 3, the rotary bushing 3 can be easily removed from the nozzle body 1. With this design, it is simple and convenient to disassemble the nozzle body 1 and the rotary bushing 3. The user only needs to rotate the rotary bushing 3, so that the protrusion 24 can be engaged with the cam 35, and a sufficient force can be provided to make the annular groove 14 on the nozzle body 1 separate from the annular rubber ring 32 on the rotary bushing 3. In this way, the user can easily replace, clean or repair the rotary bushing 3, so as to achieve a better maintenance and use experience.

Referring to FIGS. 8, 9, 10 and 11, the nozzle core 34 can be a spherical nozzle core 34, a straight nozzle core 34, a rotary nozzle core 34 or a multi-port nozzle core 34. When users use the nozzle, different types of nozzle cores 34 can be chosen according to their own preferences and needs (that is, choose different nozzle cores 34), such as spherical, straight, rotary or multi-port nozzle cores 34, so as to obtain personalized and diversified massage effects.

Figure 5:
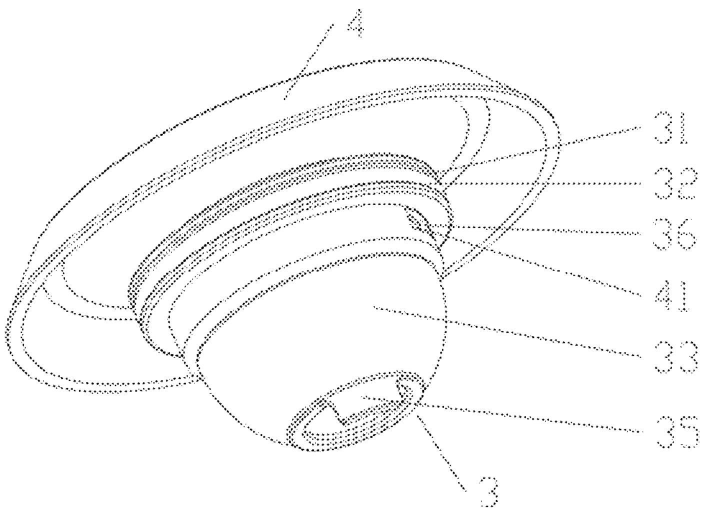
FIG. 5 is a schematic structural diagram of the rotary bushing of the present invention.
Figure 6:
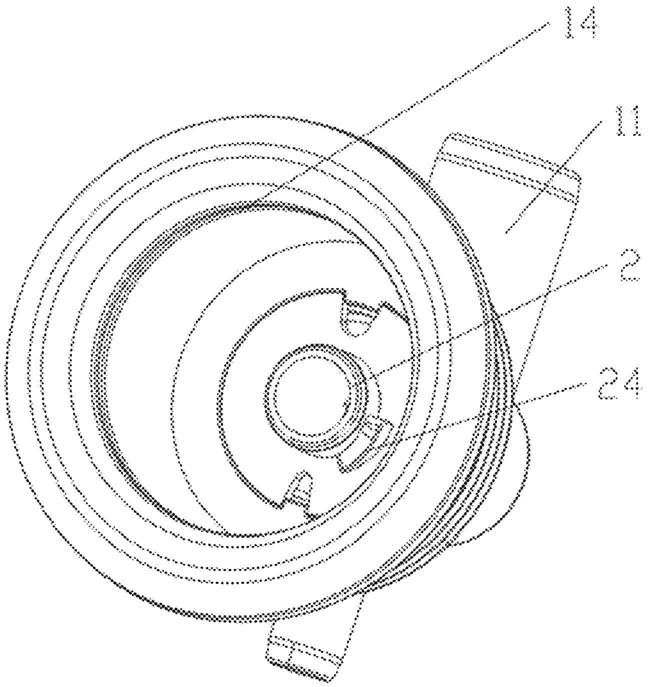
FIG. 6 is a partial view of the massage nozzle for a hot tub of the present invention.
Figure 7:
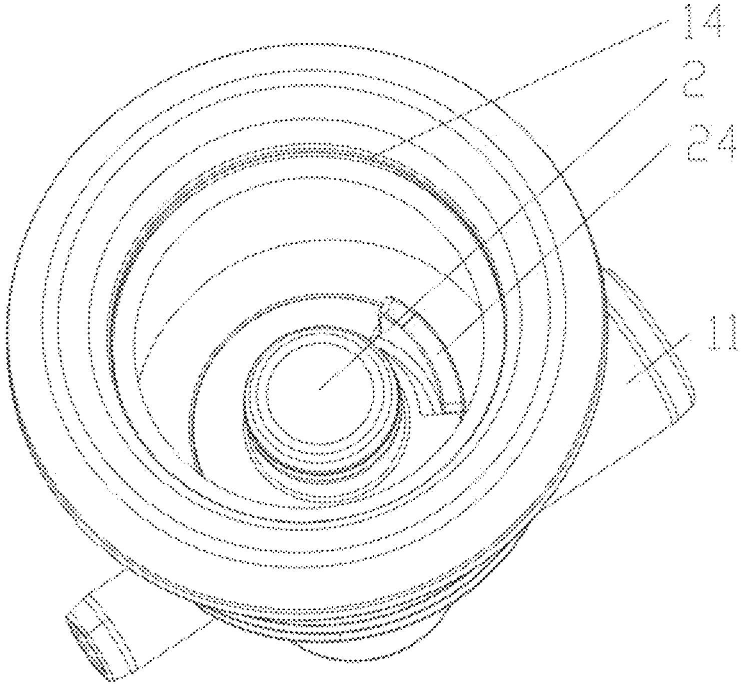
FIG. 7 is a partial view of the massage nozzle for a hot tub of the present invention.
Figure 8:
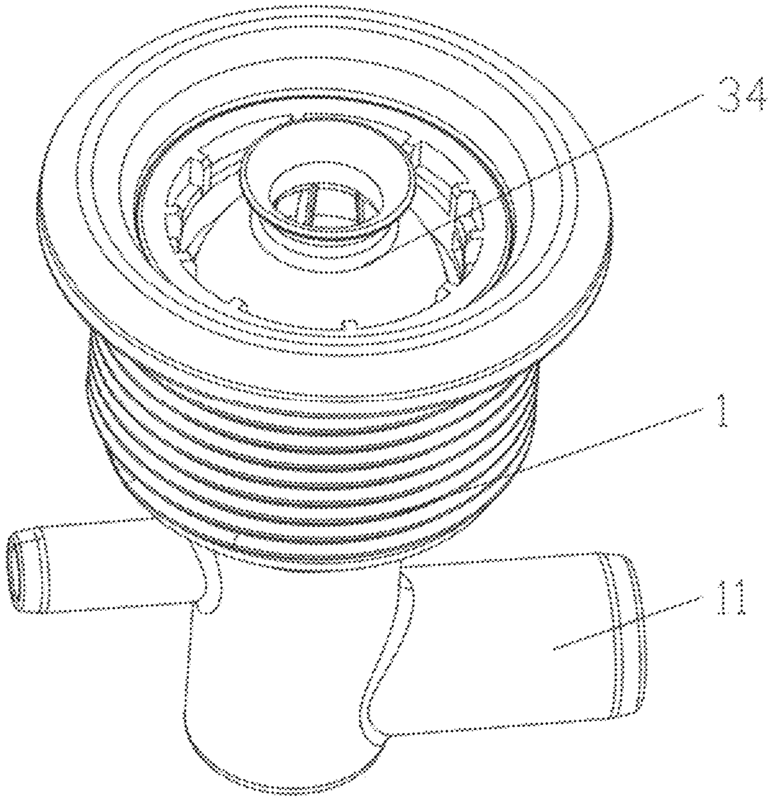
FIG. 8 is a sectional view of a massage nozzle for a hot tub with a spherical nozzle core.
Figure 9:
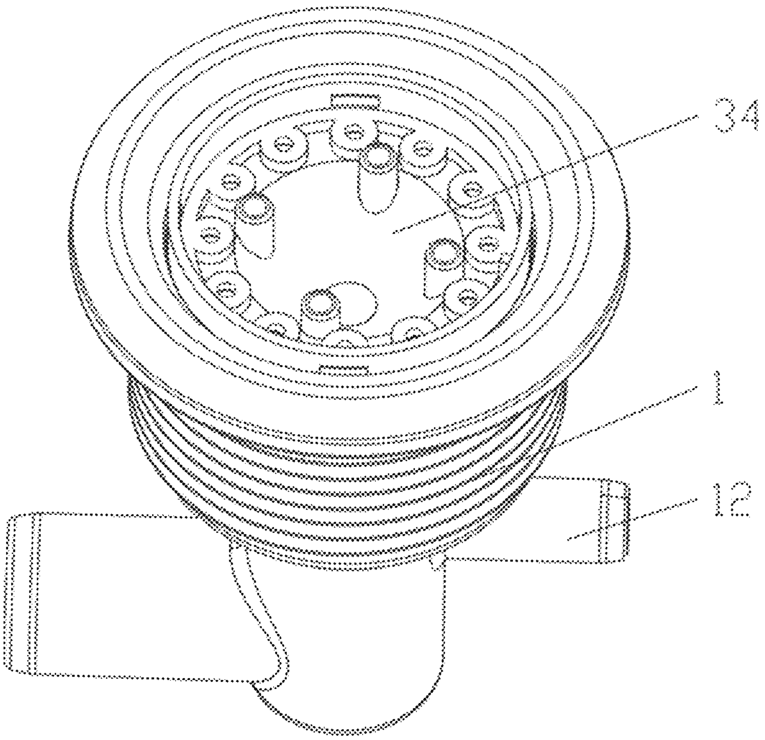
FIG. 9 is a sectional view of a massage nozzle for a hot tub with a multi-port nozzle core.
Figure 10:
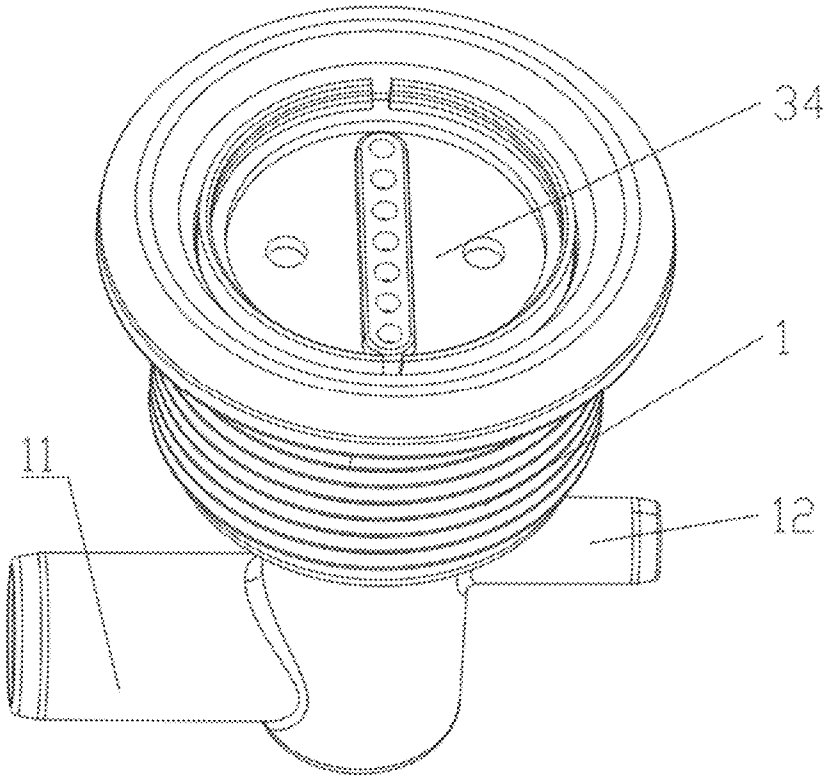
FIG. 10 is a sectional view of a massage nozzle for a hot tub with a straight nozzle core.
Figure 11:
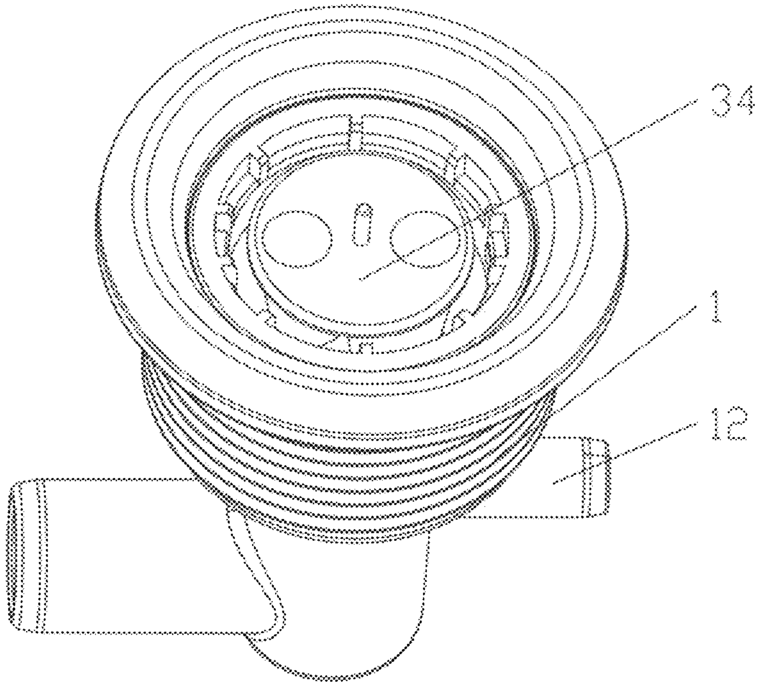
FIG. 11 is a sectional view of a massage nozzle for a hot tub with a rotary nozzle core.

Referring to FIG. 5, it is preferred that the rotatory bushing 3 is provided with a catch slot 36, and the side of the nozzle surface cover 4 is provided with a catch 41 for engaging in the catch slot 36. During installation, the connection between the nozzle surface cover 4 and the rotary bushing 3 is realized by engaging the catch 41 on the nozzle surface cover 4 into the catch slot 36 at the rotary bushing 3, which is simple and reliable.

Referring to FIG. 1, it is preferred that the outer side of the nozzle body 1 is provided with an external thread 15. The massage nozzle for a hot tub also includes a fastener 5 with an internal thread, which is screwed onto the external thread 15 of the nozzle body 1, and is engaged with the nozzle surface cover 4 so as to be installed at the installation position on the hot tub.

The present invention provides a massage nozzle for a hot tub, which comprises a nozzle body 1, a nozzle body Venturi core 2, a rotary bushing 3 and a nozzle surface cover 4. Two ends of the nozzle body Venturi core 2 are welded with the inner wall surface of the water inlet end of the nozzle body 1, and one end of the nozzle body Venturi core 2 away from the water spraying end is welded between the water inlet 11 and the air inlet 12. A plurality of air inlet through holes 21 is defined through a side wall of the nozzle body Venturi core 2. The welding of the two ends of the nozzle body Venturi core 2 achieves improved airtightness of the air cavity formed between the outer wall surface of the nozzle body Venturi core 2 and the inner wall surface of the nozzle body 1. When the air inlet 12 sucks air, the air entering the air inlet 12 passes through the air cavity and is mixed into the water through the air inlet through holes 21, which enhances the Venturi effect and enables the air to have a stronger acceleration and pressure when flowing through the nozzle, thus forming more bubbles and stronger massage effect. Therefore, the massage nozzle for a hot tub achieves better Venturi effect and air jetting effect, provides users with more comfortable, richer and more personalized massage experience, and improves the function and practicability of hot tub massage facilities.

It should be noted that, for traditional massage nozzles having a switch function, it is necessary to keep the nozzle seat body facing the nozzle core to allow the water comes out. The water outlet direction of the nozzle is fixed and is difficult to adjust. However, the nozzle body Venturi core in this application is configured such that the appearance of the nozzle can be adjusted to be uniform after installation. For example, the appearance of multiple message nozzles with non-circular water outlet or non-circular nozzle surface cover can be kept uniform through adjustment after they are installed in the hot tub. In addition, in use, the nozzle surface cover can be easily rotated and adjusted. Therefore, the user can adjust the water outlet direction according to the user own massage requirements, which would be difficult for the traditional massage nozzle to achieve. For example, the straight water outlet can be adjusted to a direction resembled by the line "-", "|", "\", "/", or the like, to meet different massage needs.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

What is claimed is:

1. A massage nozzle for a hot tub, comprising a nozzle body, a nozzle body Venturi core, a rotary bushing and a nozzle surface cover; wherein the nozzle body comprises a water inlet end and an opposite water spraying end, wherein the water inlet end is provided with a water inlet and an air inlet, the water inlet and the air inlet are staggeredly arranged relative to each other, and the air inlet is closer to the water spraying end than the water inlet; the water spraying end is formed with an accommodating through hole allowing for insertion of the rotary bushing; two ends of the nozzle body Venturi core are sealed and welded with an inner wall surface of the water inlet end of the nozzle body, and one end of the nozzle body Venturi core away from the water spraying end is welded between the water inlet and the air inlet; a side wall of the nozzle body Venturi core is provided with a plurality of air inlet through holes, and the nozzle body Venturi core is hollow in a length direction as a water flow channel; the rotary bushing is arranged at the water spraying end, and comprises a water inlet channel which is connected with the nozzle body Venturi core, and the nozzle surface cover is arranged on a side of the rotary bushing away from the nozzle body Venturi core;

wherein the nozzle body Venturi core comprises a hollow cylindrical Venturi core body and a support platform arranged on an outer periphery of the hollow cylindrical Venturi core body; an end of the hollow cylindrical Venturi core body away from the support platform is welded between the water inlet and the air inlet, and the support platform is circular-ring shaped and welded on an inner wall surface of the nozzle body.

2. The massage nozzle for a hot tub according to claim 1, wherein an inner wall surface of the nozzle body at the accommodating through hole is provided with an annular groove which is concave toward an outer wall surface of the nozzle body, an outer side of the rotary bushing is provided with an annular accommodating groove, and an annular rubber ring adapted to the annular groove is arranged in the annular accommodating groove.

3. The massage nozzle for a hot tub according to claim 1, wherein the rotary bushing comprises a rotary bushing body and a nozzle core; the rotary bushing body has a trumpet-like structure with a small-diameter end portion and a large-diameter end portion, the small-diameter end portion of the rotary bushing body is inserted into the hollow cylindrical Venturi core body, and the large-diameter end portion of the rotary bushing body is provided with the nozzle core.

4. The massage nozzle for a hot tub according to claim 1, wherein the rotary bushing comprises a rotary bushing body and a nozzle core; the rotary bushing body has a trumpet-like structure with a small-diameter end portion and a large-diameter end portion, the small-diameter end portion of the rotary bushing body is inserted into the hollow cylindrical Venturi core body, and the large-diameter end portion of the rotary bushing body is provided with the nozzle core.

5. The massage nozzle for a hot tub according to claim 2, wherein the rotary bushing comprises a rotary bushing body and a nozzle core; the rotary bushing body has a trumpet-like structure with a small-diameter end portion and a large-diameter end portion, the small-diameter end portion of the rotary bushing body is inserted into the hollow cylindrical Venturi core body, and the large-diameter end portion of the rotary bushing body is provided with the nozzle core.

6. The massage nozzle for a hot tub according to claim 3, wherein a cam is arranged at a distal end of the small-diameter end portion of the rotary bushing body, and a protrusion for engaging with the cam is arranged on the support platform.

7. The massage nozzle for a hot tub according to claim 4, wherein a cam is arranged at a distal end of the small-diameter end portion of the rotary bushing body, and a protrusion for engaging with the cam is arranged on the support platform.

8. The massage nozzle for a hot tub according to claim 5, wherein a cam is arranged at a distal end of the small-diameter end portion of the rotary bushing body, and a protrusion for engaging with the cam is arranged on the support platform.

9. The massage nozzle for a hot tub according to claim 3, wherein the nozzle core is one of a spherical nozzle core, a straight nozzle core, a rotary nozzle core and a multi-port nozzle core.

10. The massage nozzle for a hot tub according to claim 4, wherein the nozzle core is one of a spherical nozzle core, a straight nozzle core, a rotary nozzle core and a multi-port nozzle core.

11. The massage nozzle for a hot tub according to claim 5, wherein the nozzle core is one of a spherical nozzle core, a straight nozzle core, a rotary nozzle core and a multi-port nozzle core.

12. The massage nozzle for a hot tub according to claim 1, wherein the rotary bushing is provided with a catch slot, and a side of the nozzle surface cover is provided with a catch engaged in the catch slot.

13. The massage nozzle for a hot tub according to claim 1, further comprising a fastener provided with an internal thread, an external thread is provided one an outside of the nozzle body, and the fastener cooperates with the nozzle surface cover to clamp the nozzle body so as to be installed and fixed.

* * * * *